(12) United States Patent
Vollkommer et al.

(10) Patent No.: US 6,246,171 B1
(45) Date of Patent: *Jun. 12, 2001

(54) GAS DISCHARGE LAMP WITH DIELECTRICALLY IMPEDED ELECTRODES

(75) Inventors: Frank Vollkommer, Buchendorf; Lothar Hitzschke, Munich; Jens Muecke, Poecking; Rolf Siebauer, Feldkirchen Westerham; Simon Jerebic, Munich, all of (DE)

(73) Assignee: Patent-Treuhand-Gesellschaft fuer elektrische Gluehlampen mbH, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/180,855
(22) PCT Filed: Mar. 20, 1998
(86) PCT No.: PCT/DE98/00826
  § 371 Date: Nov. 17, 1998
  § 102(e) Date: Nov. 17, 1998
(87) PCT Pub. No.: WO98/43276
  PCT Pub. Date: Oct. 1, 1998

(30) Foreign Application Priority Data

Mar. 21, 1997 (DE) .............................. 197 11 890
Mar. 21, 1997 (DE) .............................. 197 11 892
Jul. 8, 1997 (DE) .............................. 197 29 181

(51) Int. Cl.[7] ................ H01J 61/92; H01J 61/30
(52) U.S. Cl. ............. 313/586; 313/491; 313/492; 313/493
(58) Field of Search ................... 313/491, 492, 313/586, 585, 494, 495, 493

(56) References Cited

U.S. PATENT DOCUMENTS

| | | | |
|---|---|---|---|
| 3,896,324 | * 7/1975 | Galves et al. | 313/587 |
| 4,562,434 | * 12/1985 | Amano | 315/169.4 |
| 5,093,603 | * 3/1992 | Kim et al. | 313/586 |
| 5,306,984 | * 4/1994 | Lee | 313/484 |
| 5,872,425 | * 2/1999 | Shino et al. | 313/582 |
| 5,932,626 | * 8/1999 | Fong et al. | 359/385 |
| 6,034,470 | * 3/2000 | Vollkommer et al. | 313/485 |
| 6,060,828 | * 5/2000 | Vollkommer et al. | 313/491 |

* cited by examiner

Primary Examiner—Michael H. Day
(74) Attorney, Agent, or Firm—Robert F. Clark

(57) ABSTRACT

A gas discharge lamp having a discharge vessel (202) which is at least partially transparent and filled with a gas filling, a number of essentially strip-shaped anodes (205, 206) and cathodes (203, 204) which extend on the walls of the discharge vessel and essentially parallel to each other, and a dielectric layer (215) between at least the anodes and the gas filling for a dielectrically impeded discharge in the discharge vessel between neighboring anodes and cathodes, characterized in that at least one anode pair (205) is arranged between two cathodes (203, 204) respectively adjacent to one anode pair.

26 Claims, 12 Drawing Sheets

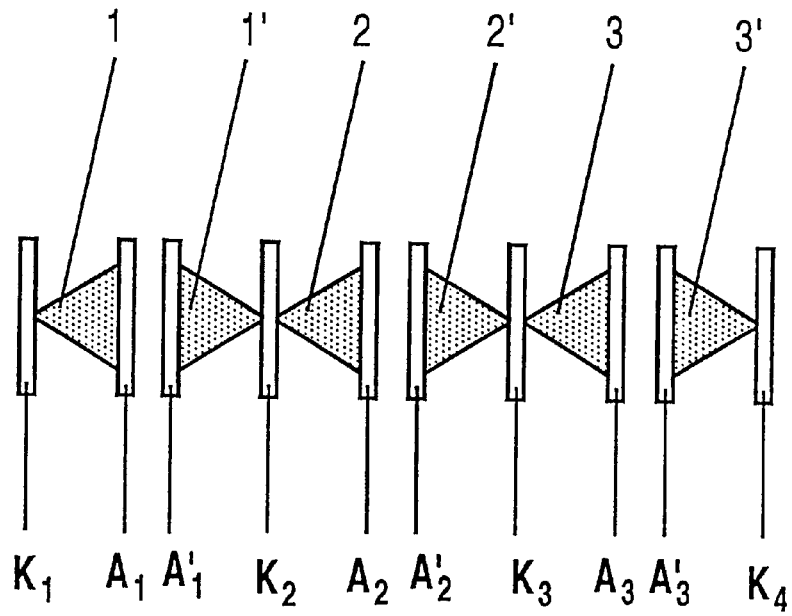
FIG.1
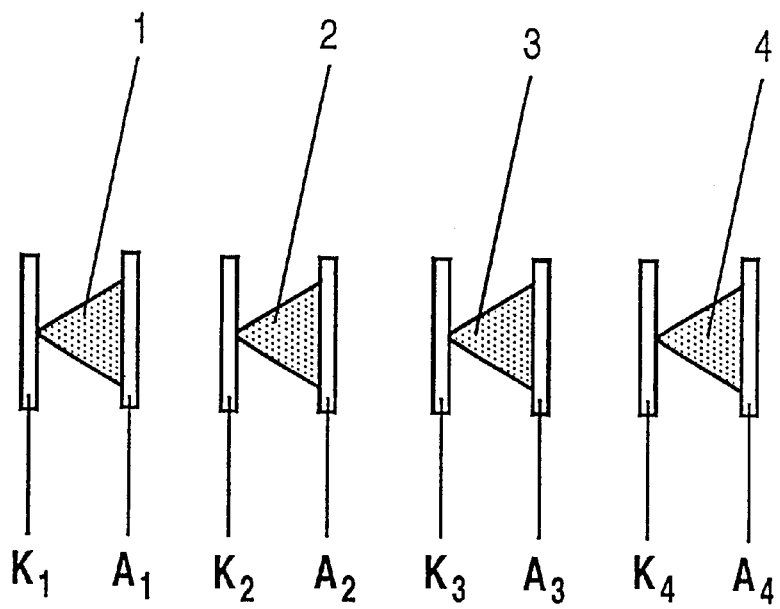
Stand der Technik  FIG.2

GAS DISCHARGE LAMP WITH DIELECTRICALLY IMPEDED ELECTRODES

TECHNICAL FIELD

The invention relates to a gas discharge lamp according to the preamble of claim 1. This gas discharge lamp has a discharge vessel including a gas filling, at least parts of the discharge vessel being transparent to radiation of a desired spectral region. Given a suitable electric supply, a number of anodes and cathodes generates a discharge in the gas filling, which either directly generates the desired radiation, or by means of which radiation emitted by the discharge excites a fluorescent material in the gas discharge lamp, which emits the desired radiation.

In the present case, a gas discharge lamp for so-called dielectrically impeded discharge is considered in which at least the anodes, possibly also the cathodes, are separated from the gas filling by a dielectric interlayer. Furthermore, the invention proceeds from anode and cathode geometries which have strips extending essentially parallel to one another, the term strip-shaped not necessarily implying edges extending parallel to one another. Here, strips means elongated formations which are thin and narrow by comparison with their length. These strips can also have specific structures along their length, as set forth further below, and need not be straight.

Strictly speaking, the terms anodes and cathodes make sense only in unipolar operation of the gas discharge lamp. However, bipolar operation is not excluded here, and in that case the difference between anodes and cathodes becomes blurred and the electrodes must in principle be separated from the gas filling by a dielectric layer. Consequently, the terms "anodes" and "cathodes" in the claims and below also include electrodes for bipolar discharges, which in each case temporarily play the role of an anode or cathode.

It is further to be made clear that the dielectric layer need not be a layer applied to the electrode especially for this purpose, but can also be formed by a discharge vessel wall, for example, if electrodes are arranged on the outside of such a wall or inside the wall.

PRIOR ART

The following documents are named in relation to the prior art:

EP 0 363 832 discloses an UV high-power radiator having elongated electrodes, which are supplied with high voltage in pairs and are separated from a gas filling by dielectric material. The anodes and cathodes are arranged next to one another in alternating sequence, with the result that a configuration of individual discharges which is of the flat type overall is produced in relatively flat discharge vessels.

An operating method for such a discharge lamp follows from WO 94/23442. In this case, specific sequences of pulses of the power supply are specifically tuned to the dielectrically impeded discharge and form overall typical delta-shaped discharges between the anodes and cathodes. In a gas discharge lamp, there are a large number of such individual discharges, which are lined up along the strip-shaped electrodes and, in the event of a suitably designed pulsed mode of operation generate the desired radiation with a very high efficiency.

DE 195 48 003 A1 discloses an appropriate circuit arrangement.

It is described in DE-A 195 26211.5 and WO 94/04625 how the above method can be applied to the previously described UV high-power radiator.

Furthermore, EP 0 607 453 discloses a liquid crystal display having a surface lighting unit composed of a plate-shaped optical conductor and a tubular fluorescent lamp. The fluorescent lamp is bent in this case in such a way that it can be arranged on two or more mutually adjacent edges of the optical conductor plate. The light from the fluorescent lamp can thereby be launched into the optical conductor plate, specifically at at least two edges, and be scattered by the plate surface towards the liquid crystal display. The aim thereby is to improve the uniformity of the illumination by using as far as possible only one fluorescent lamp.

THE INVENTION

The present invention is based on the technical problem of further developing the gas discharge lamp described in the beginning, according to the preamble of claim 1. The invention thus aims at a method of production for this gas discharge lamp, and at a lighting system having this gas discharge lamp and an electric supply, and also at screen systems in which the lamp according to the invention is combined with a screen.

Overall, the solution to this technical problem takes the form firstly of a gas discharge lamp having a discharge vessel which is at least partially transparent and filled with a gas filling, a number of essentially strip-shaped anodes and cathodes which extend on walls of the discharge vessel and essentially parallel to one another, and a dielectric layer between at least the anodes and the gas filling for a dielectrically impeded discharge in the discharge vessel between neighbouring anodes and cathodes, at least one anode pair being arranged between two cathodes adjacent in each case one anode of the pair.

Furthermore, the invention comprises the method of production according to claim 20, the lighting system according to claim 21 and the flat screen system according to claim 22, as well as the respective refinements in the dependent claims.

The advantage of the anode pair between neighbouring cathodes resides chiefly in that in each case only one of the two anodes of the pair is assigned as nearest anode neighbour to one of the cathodes. As a result, no situations can arise in which two equivalent nearest neighbour cathodes are present starting from an anode. To be precise, it has emerged that in this case individual discharges occur in a not exactly predictable way between the anode and one of the two cathodes concerned. This choice of one of the two sides is frequently not uniform over the entire strip length of the electrodes, and can also change with time. Conventional electrode geometries thus do not permit far-reaching spatial and temporal homogenization of the discharge distribution nor, therefore, a truly precise control of the luminous density distribution in the lamp.

"Denser packages" of individual discharge structures can also be produced by the invention as an additional aspect, the result being an improved power density.

In the case of a bipolar operation the terms anodes and cathodes are to be related here in each case to electrodes of one polarity of electric supply. As a result of the exchangeability of the polarities in the bipolar case, the electrodes of both polarities are preferably arranged in pairs in any case given repeated electrode strip arrangements.

However, it holds both for the unipolar and for the bipolar case that the arrangement of electrodes in pairs need not be implemented for the entire gas discharge lamp, but can be dispensed with in the edge regions. Furthermore, it is to be noted that given the alternating arrangement, according to the invention, of pairs of electrodes of the same polarity with the polarity of changing in pairs, electrode pairs exist in each case between which no electrode pair of the other polarity is arranged (specifically, no electrode at all).

In addition to better suitability for bipolar operation, it can be a further advantage of pairwise arrangement of the cathodes as well that the typical delta-shaped discharge structures stand with a tip on the cathodes, and the separation of the cathodes avoids the concentration of two discharge tips at the same point of the same cathode. It is possible thereby to avoid possible thermal problems or stability problems in specific applications.

Preferably the invention is directed to gas discharge lamps having a discharge vessel of electrically non-conductive material and having a flat radiator geometry. Especially with flat discharge vessel geometries the advantages obtained by the invention of an increase in the achievable power density and an improvement of the homogeneity play a role.

In other words, the invention relates in particlar to a flat radiator having an at least partially transparent discharge vessel of electrically non-conductive material that is closed and filled with a gas filling or is open and has a gas or gas mixture flowing therethrough, and having elongate electrodes arranged on the wall of the discharge vessel, cathodes and anodes being alternately arranged adjacent one another, and at least the anodes being separated from the interior of the discharge vessel by a dielectric material, characterized in that an additional anode is in each case arranged between neighbouring cathodes, that is, an anode pair is arranged in each case between the neighbouring cathodes.

In the interest of raising the power density in the gas discharge lamp, the mutual spacings between electrodes of a pair can be smaller than the respective spacings from the neighbours of different polarity. A preferred range for the mutual spacing of the electrodes of a pair is in this case between half and double the value of the individual electrode width.

However, there may also be applications in which the lamp is to be operated at low power. In that case it may even be advantageous to choose the mutual spacing of the electrodes of a pair greater than the respective spacing from the neighbours of different polarity. A sensible definition for the spacing of the electrodes of a pair refers to the striking distance of the discharge. Expressed via the striking distance the electrode spacing in the pair is preferably below 200% of the striking distance. A favorable lower limit for the electrode spacing in the pair—also in applications in which the power density is to be increased, is at 10% of the striking distance. Further preferred lower limits are 20% and 40% of the striking distance, and preferred upper limits are 100% and 70% of the striking distance.

In a preferred variant of the invention, at least one electrode type is arranged on an inner wall of the discharge vessel, preferably all the electrodes. By contrast with the case in which the dielectric layer is formed by a wall of the discharge vessel, it is now possible to optimize the properties of the dielectric layer, which is thereby to be applied separately, in particular its thickness as a parameter for the ignition voltage and the operating voltage of the discharge, exclusively under aspects of the discharge. In the other case, it is chiefly mechanical aspects which play an important role.

However, the problem of gas-tight electrical feedthroughs is basically associated with live components inside a discharge vessel or a closed lamp bulb. Because of the required tightness of the feedthroughs, required work steps are generally complicated and are required, in any case, in addition to the usual production steps. The invention provides to use the strip shape of electrodes itself as feedthrough, as it were, or in other words to dispense entirely with separate feedthroughs and to guide the electrodes as an extension through the discharge vessel.

This approach is suitable, in particular, for flat discharge vessels or discharge vessels having at least one flat plate, in which the electrodes are applied to the plate, specifically the inner wall of the discharge vessel. In this case, the electrode structure is such that the actual electrode sections inside the discharge vessel and the feedthrough sections and possible external sections are all produced as a result of a uniform production method for depositing or applying the electrodes on or to the plate. In this application the terms flat discharge vessels, flat radiators, or flat plates are not limited to plane flat geometries, but also include arched flat shapes.

In the case of a discharge vessel for a flat radiator which is constructed from two plates and an external frame connecting the latter, for this purpose the frame is, for example, simply mounted on the electrodes applied to a plate and connected thereto in a gas-tight fashion, the flat electrode strips not having a disturbing effect. This results in simplifying not only the production with regard to the elimination of specific production steps for conventional gas-tight electrical feedthroughs (through the plate or through the frame).

It is also possible to tailor the electrode geometry inside the discharge vessel totally to the optimization of the discharge geometry and, for example, to dispense with combining the electrodes to form a common conventional electrical feedthrough. Rather, the solution according to the invention can also be used to execute the electrodes in a self-contained fashion in each case or in relatively small subgroups.

It is stated here by way of precaution that the applicant reserves the right to make a patent claim for the features of claim 4 possibly in conjunction with features of dependent claims referred back to it, in conjunction with the features of the preamble in claim 1, but without the characterizing feature of claim 1.

A preferred embodiment of the feadthroughs simplified according to the invention assumes that the discharge vessel has at least one plate. It is not absolutely necessary thereby to have a flat radiator which is essentially plate-shaped as a whole; rather, the side of the discharge vessel opposite the plate can also have a different shape. In this case, it is possible for the electrodes to be arranged on the plate of the discharge vessel in such a way that they extend along the plate and are guided through the boundary of the discharge vessel. This can be done, for example, by printing the electrodes onto the plate and then mounting the plate together with the remainder of the discharge vessel, for example by means of a glass solder layer.

A technical difficulty in guiding the electrode strips on the plate in a way according to the invention through a boundary of a discharge vessel can consist in avoiding as far as possible interruptions in the electrode conductor tracks owing to thermal or mechanical loading. Such a breakage leads to the failure of an electrode or of an electrode group, and thereby worsens at least the uniformity of the generation of radiation. This is particularly critical in the case of a preferred embodiment of the invention, treated further below, as a flat backlighting lamp for screens and similar equipment. The failure of electrodes is intolerable in such applications and comparable ones, even in the case of a large number of electrodes.

It is provided according to the invention that in conjunction with an essentially rectangular cross-section of the anodes and/or cathodes, the thickness of the strip shape, that is to say the height of the assumed rectangle perpendicular to the plate, is in the range of 3–50 μm and preferably above 5 or 8 μm. Strip widths of 0.3–1.5 mm, preferably 0.5 to 1.2 mm, are advantageous in this case.

The lower limit of the strip thickness is determined by the fact that an adequate current-carrying capacity cannot be achieved in the case of excessively small thicknesses, with the result that the electric resistance of the electrodes becomes too high, or the thermal loading by the Joule heat losses of currents (possibly punctiform) becomes too high and can thus lead to material breakages. The last aspect also holds, in particular, for the points at which, in addition, thermal loading occurs owing to a discharge structure or discharge tip burning in the surroundings.

On the other hand, the layer thickness should preferably not be above the specified value, because the yield point of the strips is to be set approximately proportional to the reciprocal root of the strip thickness. Excessively thick electrode strips thus lead to breakages, even in the case of low mechanical or thermal loads. It has emerged, furthermore, that the specified values hold to a good approximation for various materials which come into consideration (for example, gold, silver, aluminium, copper).

The specified strip widths assume that specific widths of electrodes are required to prevent unfavourable space charge effects. The specified thickness values are thus to be understood in conjunction with the widths of the strips, in particular. The rectangular cross-sectional shape assumed here naturally represents only a rough approximation in many cases, and serves here, to a certain extent, only as a model for defining the terms width and thickness. Other shapes are, of course, also possible in conjunction with the dimensions given here, as long as the terms width and thickness can be defined sensibly.

Of course, within the meaning of the invention, both the anodes and the cathodes can be applied to the inner wall or to various inner walls and can be guided through in the way described in the extension of their strip shape.

It has already been pointed out that this way of guiding the strips through, which is particularly easy in terms of production engineering, has the advantage that the individual electrodes need not necessarily be combined inside the discharge vessel to form a single terminal of an anode feedthrough or cathode feedthrough. Specifically, it is also immediately possible to have many feedthroughs from individual electrodes or electrode groups which are then not combined until outside the discharge vessel. In particular, it is advantageous for all individual electrodes to be assigned outside the discharge vessel to a common supply lead bus.

A further aspect according to the invention and relating to the strip shape of electrodes consists in that the width of an anode strip is not constant, but is wider in an edge region than in a middle region of the discharge vessel. As a result, the luminous density can be varied inside the overall arrangement of the electrodes, because the electric current density of the discharges increases with the widening.

It is preferred in this case for the widening to be carried out in such a way that it extends principally towards the respective other anode of the anode pair. This has the advantage of a not, or slightly changed spacing between the anodes and cathodes, with the result that the ignition conditions along the electrode strips remain essentially constant. Given marked inhomogeneities in the ignition conditions, there is otherwise a risk that discharge structures can form not along the entire electrode lengths. The aim overall is to control the luminous density of the finished lamp specifically, for example to homogenize it or also to tailor it to possible inhomogeneous transmission properties, for example of a flat screen. It is possible thereby to counteract edge darkening. Also, darkenings resulting from spacers described below can be reduced accordingly, that is, especially in cooperation with a diffuse optical element on the light exit opening of the gas discharge lamp. For this, the widenings must lie in the surroundings of the spacers.

If the yield of the gas discharge lamp is a decisive factor, an arrangement has proved to be advantageous in which the anodes and the cathodes are not arranged on the same inner wall of the discharge vessel. This relates, in particular, to the case of flat radiators in which two opposite inner walls of discharge vessel plates are present. If then the anodes are arranged on one plate and the cathodes on the other plate, the anode strips and cathode strips are advantageously offset relative to one another in the projection onto a plane parallel to the plate in such a way as to produce essentially symmetrical V structures in the case of an imaginary connecting line between respectively nearest neighbour anodes and cathodes seen in the direction of the strip.

As a result, the discharges thus burn from one plate of the discharge vessel through the discharge space to the other plate. Owing to the offset arrangement, the striking distance is greater than the plate spacing. This geometry exhibits high yields, which is probably to be ascribed to the reduction in the wall and electrode losses. Since in the unipolar case the anode strips are frequently constructed to be narrower than the cathode strips, it is frequently preferred for the anode strips to be laid onto a light-transmitting side, in order to minimize shading. However, due to the doubling of the anodes, the inverse case can also be advantageous.

It has already been stated at the beginning that the strip shapes can have specific structures along their length. A preferred example of this are projections, relatively short in the longitudinal direction of the cathode strips, for spatially fixing an individual discharge structure. Owing to the projection, the spacing to the nearest anode is somewhat shortened in a localized fashion, with the result that a discharge structure settles on the projection with its tip. Given adequate power injection, individual discharge structures then sit on all the projections.

This measure can be used to influence the surface distribution of the discharge structures in favour of an improved homogenization or in favour of controlling the luminous density distribution. It is also possible to avoid displacements due to thermal convection or temporal fluctuations owing to a spatially unstable charge structure distribution.

It is possible, in particular, to arrange the projections more densely in an edge region of a discharge volume than in a middle region, thus achieving an effect which is comparable to that achieved with the already described widening of the anode strips.

A further aspect of the invention relates to spacers between two plates of a discharge vessel for a flat radiator, as well as to the geometrical arrangement of the spacers. In the case of flat radiator discharge vessels, two plates, a base plate and a top plate, are provided essentially parallel to one another at a relatively small spacing by comparison with the extent of their length or width. In order to ensure as accurate a spacing as possible of the plates from one another over the entire surface of the plates, and/or in order to render the entire flat radiator discharge vessel mechanically stronger, it is possible to provide between the plates spacers which in each case can be connected firmly to the base plate and to the top plate. However, even without such fastenings, the spacers act in a fashion improving stability.

With regard to as great a mechanical strength as possible of the discharge vessel, such spacers are particularly advantageous and are also of importance with regard to the previously represented shape, according to the invention, of the electrical feedthroughs. The smaller the probability and the magnitude of bending movements of the discharge vessel during the production and operation, the smaller is the mechanical loading of the electrode strips, specifically in the feedthrough region, in particular. For the sake of mechanical stability, the spacers should be arranged as densely as possible in this case.

On the other hand, every additional spacer is basically associated with an increase in the losses during the generation of light. This affects, on the one hand, additional wall losses of the discharge itself owing to the additional edge faces of the spacer and, on the other hand, the light absorption, never to be entirely avoided, and the additional scattering.

The invention therefore provides preferred regions for the mutual spacing of spacers which have the relationship of nearest neighbour with one another. Two magnitudes are sensible in this case, and each produces a relationship with the geometry of the flat radiator discharge vessel.

The mechanical loadability of the electrode strips is firstly a function of their thickness. The thicker the electrode strips, the more rigid the discharge vessel should be. Consequently, the product of the electrode thickness—the thinnest in the case of deviating thicknesses—and the nearest neighbour spacing of the spacers is a sensible reference variable and is advantageously in the range of $5 \times 10^{-8}$ m$^2$–$6.8 \times 10^{-7}$ m$^2$; a preferred lower limit is $10^{-7}$ m$^2$ and a preferred upper limit $5 \times 10^{-7}$ m$^2$.

A second sensible variable is the ratio of the nearest neighbour spacing of the spacers to the base plate thickness and/or the top plate thickness, depending on which is the smaller. The preferred range is here between 8 and 20, with a preferred lower limit at 10 and a preferred upper limit at 15. It is assumed in this case that the materials, in particular special glasses, coming into consideration for the plates of the discharge vessel, have essentially comparable elastic properties. For this reason, the plate thickness is entirely adequate here as a parameter for an approximate indication.

Which of the two geometrical criteria is decisive depends on the individual case. In general, it is best if the arrangement of the spacers is tailored both to the plate thickness and to the strip thickness in the way specified above.

A further possible refinement of the invention relates to the already mentioned case in which at least a part of the electrodes is arranged on or in a wall of the discharge vessel, which is of transparent design and serves to emit the light generated. (The term light is preferably to be related here to visible light, but does not exclude other spectral regions, in particular in the UV.) In the preferred refinement, an electrode structure is provided which exhibits the largest part of the current-carrying capacity in a first part which is a good electric conductor, and moreover has a second part which, although it has a lesser conductivity in conjunction with a greater width than the first part, nevertheless consists of a material which is at least partially transparent (with regard to the desired radiation). The two parts are connected to one another in an electrically conducting fashion, something which can also be realized in a purely capacitive coupling given high-frequency operation of the lamp.

The purpose of this design consists, on the one hand, in that the comparatively narrow first part can be made from a material selected with regard to the current-carrying capacity, for example a metal such as silver, gold, aluminium or copper, while the small width ensures a particularly slight shading effect in the transparent discharge vessel wall. On the other hand, arbitrarily narrow electrodes can be used only with difficulty in the case of a dielectrically impeded discharge, because the strong field concentration leads to undesired space charge effects. Consequently, the potential of the first part is "distributed" over a wider area by the second, electrically coupled part, with the result that the greater width of the second part counts with regard to the physics of the discharge.

It is preferred in this case—even because of the simple production—but not necessary, for the two parts of the electrodes to be in direct contact with one another. It is preferred, in particular, for the electrode parts to be deposited on the same area, and for the second part to be laid over the initially deposited first part in such a way as to produce the cross-sectional shape which is essentially rectangular overall (which can be "caused to bulge" somewhat by the first part).

Beyond an individual gas discharge lamp, the invention also relates to a lighting system composed of a lamp of the type described above and having an electric pulsed power source. The pulsed power source is optimized with regard to the dielectrically impeded discharge in the lamp, and injects into the lamp effective power pulses of specific length which are separated from one another by pauses of specific length, the result being, however, a continuous lighting operation of the lamp, that is to say no visible flickering. The term "continuous" refers here, of course, to the resolution of the human eye.

The invention also relates to a flat screen system, because the lamp described here is suitable as a flat radiator, in particular for background lighting of display devices such as flat screens. For this purpose, the flat radiator lamp and the flat screen are arranged essentially parallel to one another. An example is shown in the exemplary embodiments. In particular, the invention relates to a flat screen system in which the abovementioned pulsed power source is incorporated.

A particular aspect of the flat screen system relates to so-called light-amplifying films (or light-amplifying plates) which are to be arranged between the flat screen and the lamp. Such films contain a surface of prism-like structure on at least one side, and can thereby constrict the solid angle range of the emergence of light from the flat radiator lamp for the purpose of back lighting the flat screen at least in one and, preferably (for example by means of two light-amplifying films), in two dimensions. An improved brightness is thereby achieved.

DESCRIPTION OF THE DRAWINGS

The different individual aspects of the invention are illustrated below with the aid of various concrete exemplary embodiments, it also being possible for the features respectively represented to be essential to the invention in other combinations. These exemplary embodiments are represented, together with a comparative example from the prior art, in the figures. In detail, FIG. 1 shows a diagrammatic representation of the anode pairs;

FIG. 2 shows a comparative example relating to FIG. 1 according to the prior art;

FIGS. 1 and 2 firstly show in comparison with the prior art the structure and function of the arrangement of anodes in pairs which accords with the invention. All that are shown in each case, in relation to the longitudinal direction, are details of an electrode arrangement, which are approximately limited to the length of individual discharge structures. It is firstly seen in FIG. 2 that individual discharge structures 1, 2, 3, 4 respectively extend from a cathode K to an anode A, although in each case only one discharge structure burns emanating from each cathode and from each anode. Consequently, there are unused interspaces, specifically between the anode $A_1$ and the cathode $K_2$, between the anode $A_2$ and the cathode $K_3$, and between the anode $A_3$ and the cathode $K_4$, in which no discharge burns.

The regularity assumed in this case of the alternating sequence of interspaces with and without a discharge structure is not mandatory, but one of several possibilities. However, the inventors have never observed the burning of two discharge structures towards one single anode A. However, it is by all means possible for two discharge structures to terminate on a cathode K.

Consequently, the arrangement according to the invention in FIG. 1 respectively provides anode strips arranged in pairs next to one another and having anodes A and A'. Given a spacing between the two anodes of a pair which is substantially smaller by comparison with the cathode-anode spacings, the result is a higher number of discharge structures relative to the length unit in the direction perpendicular to the strip direction than in the case of a structure according to FIG. 2. The reason for this is that a discharge structure burns in each nearest neighbour pairing of anode A or A' and cathode K. The relationships in FIG. 1 (and, of course, also in FIG. 2) must of course be understood as being multiplied in each case in the strip direction of the electrodes. Only one length unit is represented in the strip direction, as it were.

It is essential that the anodes A of FIG. 2 are respectively present in pairs as anodes A and A' in FIG. 1, with the result that in addition to FIG. 2 the discharge structures are added between A'1 and K2, between A'2 and K3 and between A'3 and K4. Given a constant anode-cathode spacing and a relatively small spacing between anodes A and A' of a pair, the result of this is virtually double the number of discharge structures per length unit perpendicular to the strip direction. For the sake of clarity, a relatively large spacing is represented in FIG. 1 between the anodes A and A'.

It is to be noted relative to the structure in FIG. 2 that in addition to the comparatively low density of discharge structures it also does not permit any prediction as to the side at which a discharge structure will form in departing from a specific anode. For example, the discharge burning between the cathode K3 and the anode A3 can also be situated instead between the anode A3 and the cathode K4. This unpredictability is coupled with a sizeable non-uniformity in the statistical mean of the generation of light per area and with a basic possibility of fluctuations over time. The disadvantages could certainly be remedied by reducing the spacing between specific neighbouring cathodes and anodes, that is to say between those with the same reference symbol in FIG. 2 as against the pairs with a different reference symbol, for example, but in this case the density of discharge structures per length unit is more strongly reduced perpendicular to the strip direction.

Figure 3A:
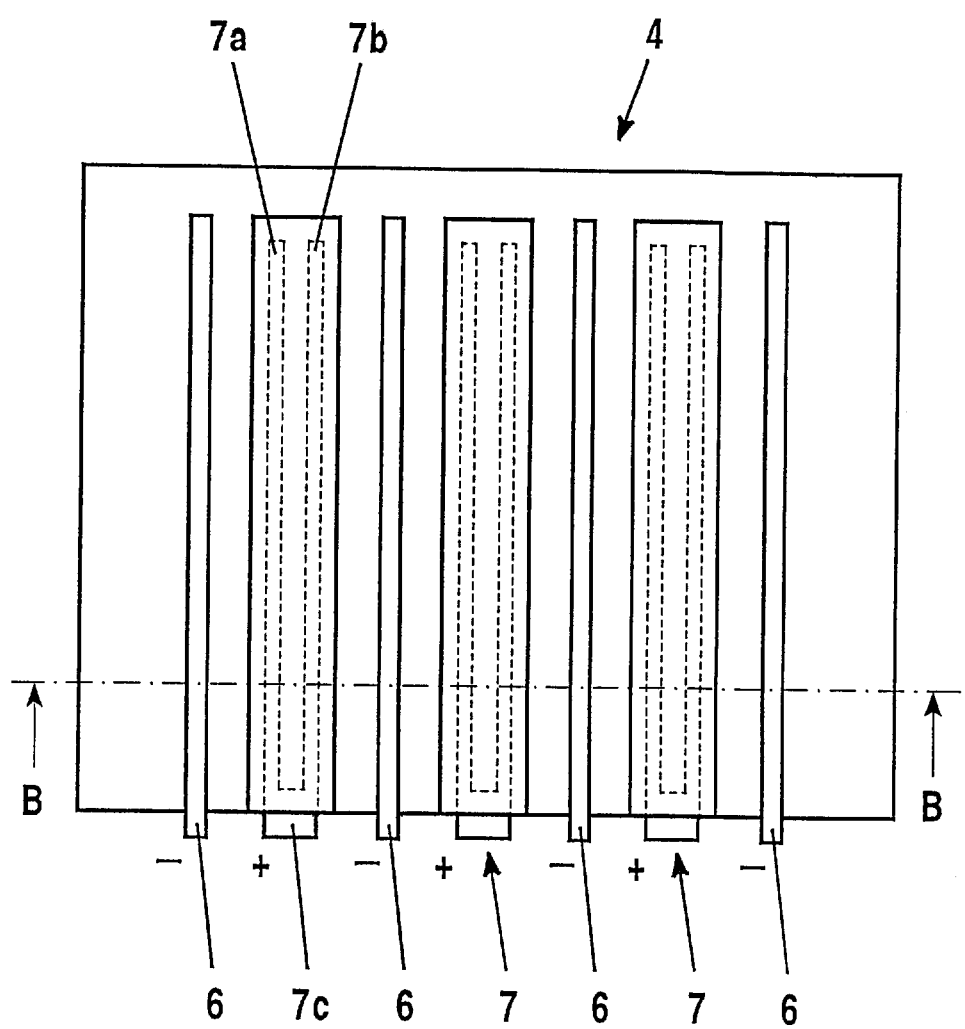
FIGS. 3a and 3b show a flat radiator according to the invention, in top view and in cross-section respectively.
Figure 3B:
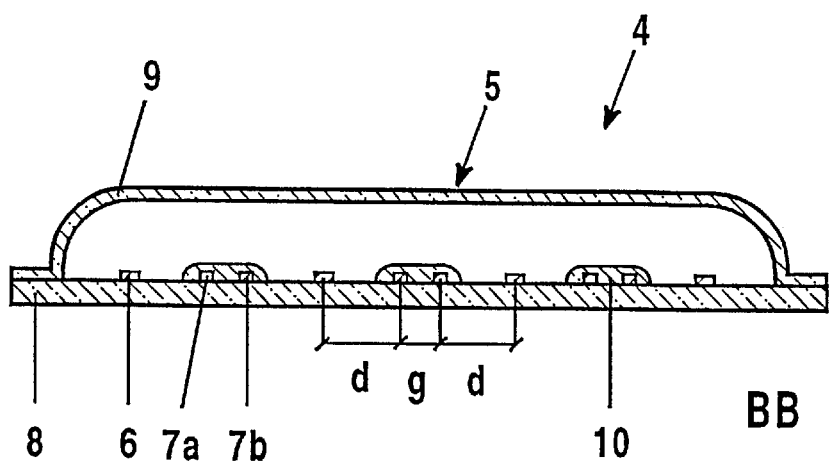

FIGS. 3a and 3b show a flat radiator according to the invention and having an electrode geometry comparable to FIG. 1. This flat radiator could be used to generate both UV or VUV, but also for illumination with visible light, given the use of suitable fluorescent materials. In FIGS. 3a and 3b, the flat radiator is denoted by 4, FIG. 3b showing that it consists of a flat discharge vessel 5 with a rectangular base surface. The discharge vessel 5 has a base plate 8 and, on the light exit side (at the top in FIG. 3b) a cover 9, not represented in FIG. 3a, which is rather trough-shaped and plate-shaped in the middle. The overall discharge vessel 5 consists of glass and is filled with a xenon gas filling at approximately 13 kPa.

Simple strip-shaped cathodes 6 and anodes 7a and 7b doubled in pairs are arranged in an alternating fashion on the base plate 8. They are printed onto the base plate 8 by screen printing before the cover 5 is fastened. It is to be seen in the top view of FIG. 3a that the electrodes go beyond the edge on one side of the base plate 8. They are guided through in this case under the gas-tight connection (by means of glass solder) between the cover 9 and base plate 8, without there being any change there to the electrode strip geometry. Rather, the electrode strips are so flat that when the cover 9 is applied it can be bonded onto the electrode strips by the glass solder.

FIG. 3b shows that the cover 9 reaches on the sides up to the edge of the base plate 8, with the result that the electrode strips in FIG. 3a project under the cover 9 on the underside. In this case, the anode pairs 7a and 7b are combined in the manner of a fork at the end 7c (in the case shown, partly still under the glass solder connection).

The cathode-anode spacing d in FIG. 3b is 10 mm; the spacing g between neighbouring anodes 7a and 7b is 4 mm.

The anodes are covered with a glass layer 10 of approximately 150 μm thickness as dielectric for the dielectrically impeded discharge at that circumference at which they rest on the base plate 8.

During operation, individual discharges are formed over the electrode structure in accordance with the pattern of FIG. 1. With this concrete example, there is a gain here of approximately 75% in the power which can be injected onto the same area unit by comparison with conventional examples.

Further details relating to the flat radiator lamp represented in FIGS. 3a and 3b, which concern an optional refinement as a flat radiator lamp for backlighting display devices with visible light are not represented further in the figures. In this case, the inner walls of the discharge vessel 5 are coated with a suitable mixture of fluorescent materials, which converts the VUV radiation generated by the discharge into visible light. This can be a three-band fluorescent material for generating the colour impression white, or another mixture of fluorescent materials. The inner wall on the base plate 8 is, moreover, coated with a light-reflecting layer, for example made from $Al_2O_3$ or $TiO_2$. In this case, light generated in the layer of fluorescent material situated thereabove is additionally reflected upwards to the side of the transparent cover 5.

Overall, this flat radiator lamp 4 for backlighting a flat screen is designed so as to ensure that light is generated in as planar and as uniform a fashion as possible. Moreover, the light output should be as high as possible, the described double anode structure being offered for this purpose.

Figure 4:
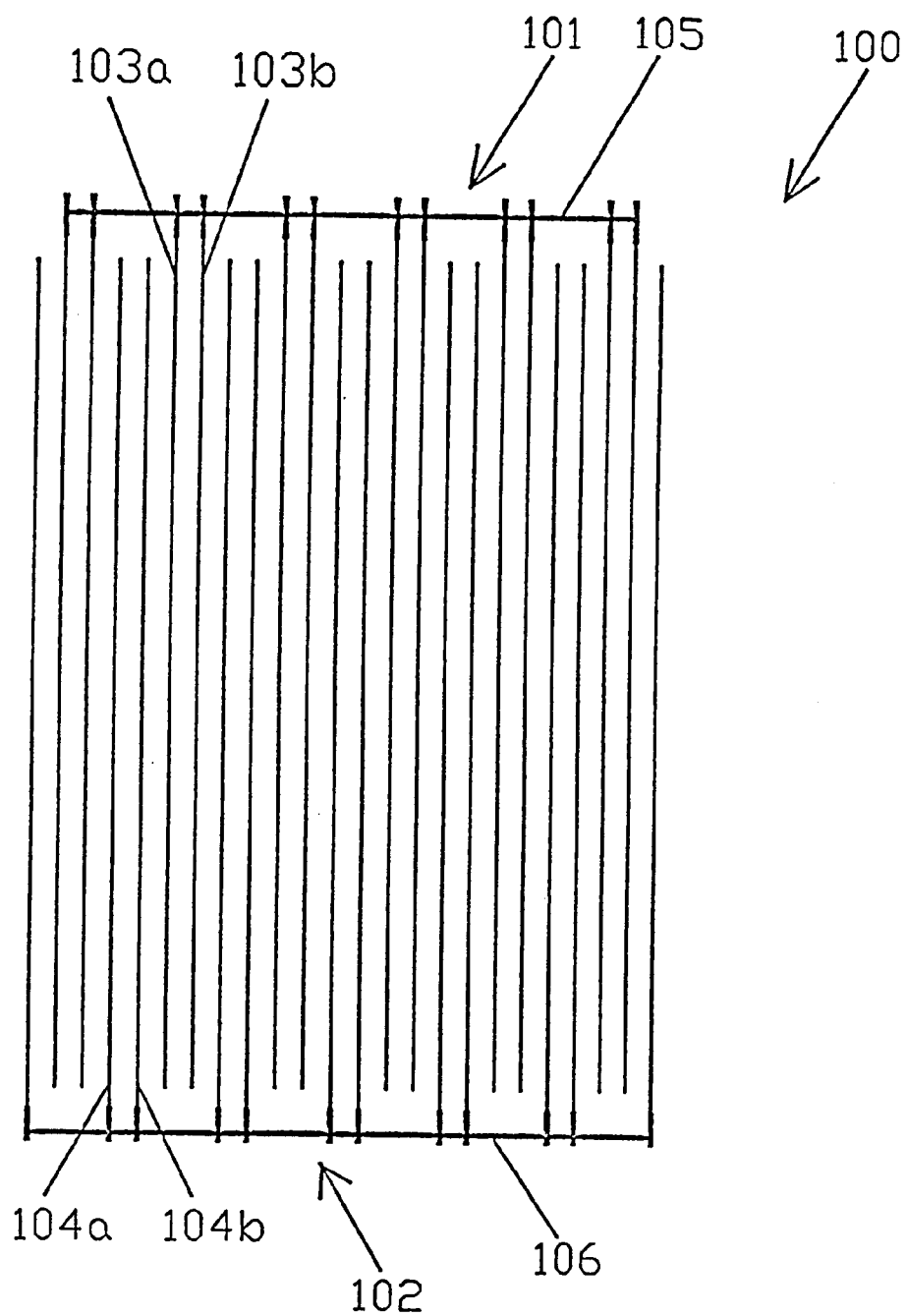
FIG. 4 shows a top view of an electrode structure according to the invention with paired electrodes of both polarities and an external bus structure.

FIG. 4 shows a diagram of an electrode structure suitable for a dielectrically impeded discharge operated in a bipolar fashion. In this case, the electrodes of both polarities are arranged in pairs and coated with a dielectric. Consequently, each electrode can act alternately as anode and as cathode. The structure denoted by 100 initially comprises a first part 101 and a second part 102. Each of these parts 101 and 102 contains a number of double electrode strips with individual electrodes 103a and 103b (for the part 101) or 104a and 104b (for the part 102) in a respective pair. Apart from the edge region (in which there is also no electrode pair), the structure is therefore symmetrical relative to the electrodes of the two polarities.

In a likewise symmetrical way, the electrodes, arranged in pairs, of each part 101 or 102, respectively, are combined to form a power supply bus structure 105 or 106, respectively. Consequently, each electrode group (of one polarity) has a comb-like structure with double "teeth", the comb structures being interlaced. In this example, the electrode spacings are equal in each case within the pairs and between the pairs. As a result the lamp can be operated in comparison with smaller spacings at smaller powers which is advantageous in determined applications.

Figure 5:
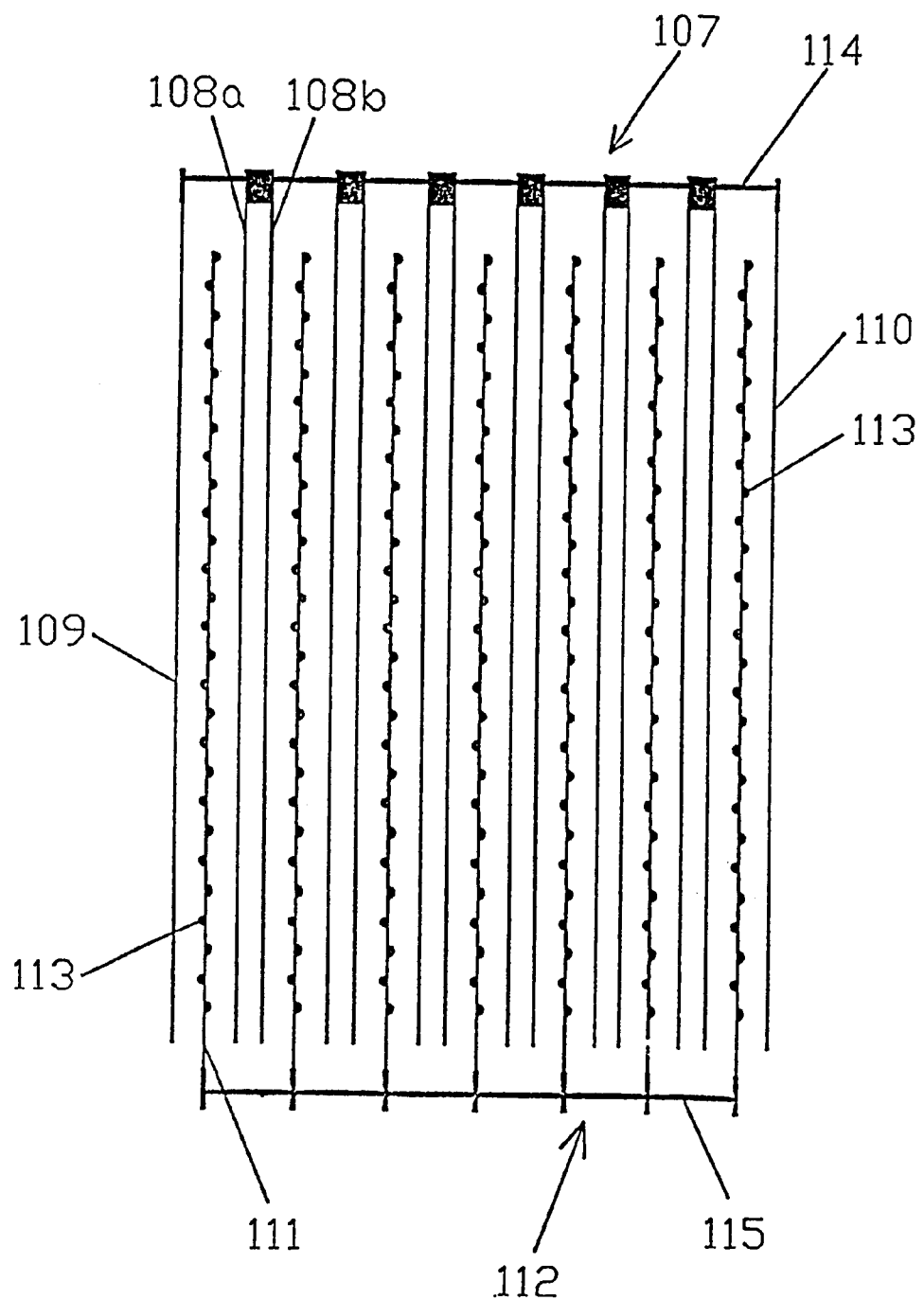
FIG. 5 shows a top view of an electrode structure according to the invention with cathodes which have projections, and anodes arranged in pairs.

By contrast with FIG. 4, FIG. 5 is modified to the extent that the electrode structure shown there does consist of two parts 107 and 112, but the part 112 is not designed in pairs, and thus forms cathodes 111 for unipolar operation. By contrast, the anode strips 108a and 108b of the anode part 107 are designed in pairs in the way described. Individual anode strips 109 and 110 are present only as an outer termination.

The projections, already mentioned in the introduction to the description, for locally fixing discharge structures are implemented in this exemplary embodiment by semicircular noses 113 on cathodes 111 of the cathode part 112. They are respectively assigned in an alternating fashion to one of the two neighbouring anodes. Owing to the local strengthening of the electric field, the individual discharges ignite exclusively at the points fixed by the noses 113.

In addition to the already mentioned aspect of homogenizing or specifically influencing the luminous density distribution, it is thereby also possible to counteract a convective displacement of the individual discharges in the case of non-horizontal operation of the lamp represented.

The bus-like supply leads 107 and 112 correspond to the explanations already given on this topic before.

The arrangements represented in FIGS. 4 and 5 respectively correspond to a flat radiator lamp with a diagonal of 6.8 inches for flat screen back lighting. A particular advantage of the structures represented in this application resides in the fact that both the electrode pairs and the electrical feedthroughs configured in accordance with the invention (which will be gone into in more detail later) and also special electrode shapes (such as in FIG. 5 and in another way in the case of the following figures) can be produced by simple production methods such as the customary method of the thick-film technique, for example, by screen printing followed by burning in. In particular, it is possible in this case to produce formats of virtually any size by means of spatially succeeding juxtapositions in rows, if appropriate, and so the structures represented here are only examples which could also have many more individual electrodes of practical purposes.

Figure 6A:
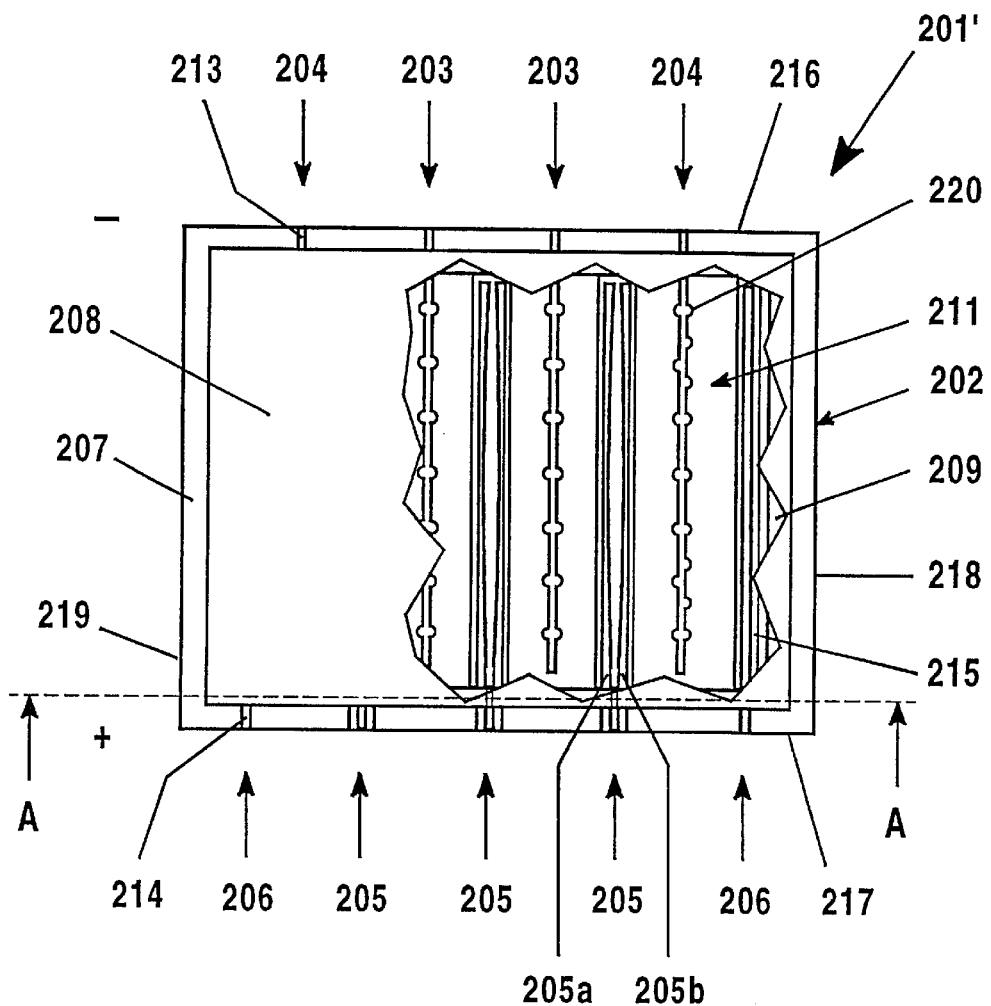
FIGS. 6a and 6b show a flat radiator lamp according to the invention with an electrode structure comparable to FIG. 5, but without the bus structure and additionally with edge widenings of the anodes, specifically in a partly cut-away top view or in a side view.
Figure 6B:
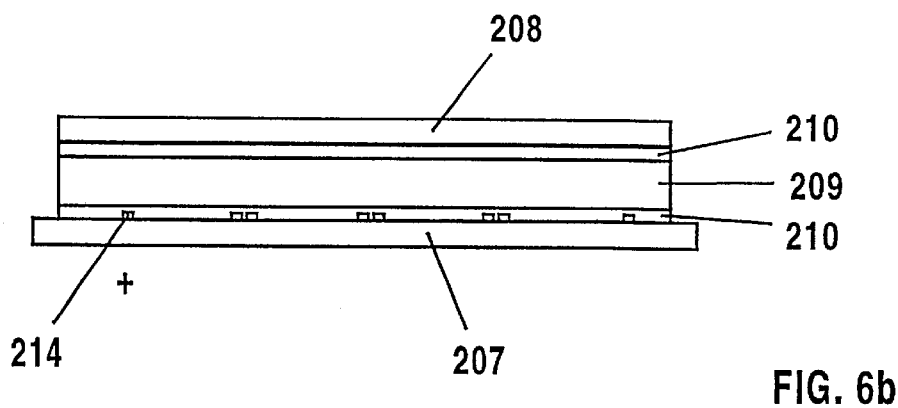

FIGS. 6a and 6b show a further flat radiator lamp 201' having a flat discharge vessel 202 with a rectangular base surface. The electrode geometry used in this case has similarities with that shown in FIG. 5. However, the cathodes 203 and 204 are guided out upwards here and not connected via a supply lead bus. The cathodes 203 in turn have projections 220, which here are arranged for the most part not in an alternating fashion but by pairs in each case. For the outermost cathodes 204, these projections are arranged in the outer region of the individual cathode strip 204 at a relatively high density (in a partly alternating fashion again, in this case), in order to increase the luminous density in the corners of the rectangle. To be precise, the absence of the contribution to the outside of the missing neighbouring electrodes has the effect in many cases that edge regions and corner regions are darkened by contrast to the luminous density in the middle of a flat radiator lamp.

The anode strips 205 are designed as pairs in the way discussed. The outermost anodes 206 are, however, present on their own. In this arrangement, the anode strips 205 in the anode pairs are widened, towards the respective edges of the rectangle by comparison with the middle of the rectangle, specifically being directed in each case towards the other anode of the pair, as is denoted by 205a and 205b. As a result, the spacing from the nearest neighbour cathode 203 or 204 is constant, but shading of the edges of the rectangle is additionally counteracted. The largest spacing between the anode strips of an anode pair 205 in the middle of the strip is about 4 mm, the smallest spacing at the edge about 3 mm.

The projections or noses 220 have a radius of about 2 mm, and shorten the spacing from the neighbouring anode strip to about 6 mm.

215 denotes a glass layer about 250 μm thick which covers the anodes 205 and 206 as a dielectric. It is present over all anode strips 205 and 206 in the interior of the discharge vessel.

The discharge vessel 202 is shown in FIG. 6b in a side view. It comprises a base plate 207 and a top plate 208, as well as a frame 209 connecting the two. The connection between the frame 209 and the plates 208 and 207 is performed by a glass solder layer 210. It can be seen in the lower region of FIG. 6b that the electrode strips are guided through this glass solder layer 210. For example, the reference numeral 214 represents the outer terminal region of the outermost left-hand anode 206 in FIG. 6a. The cathodes 203 and 204 are guided through to the other side (not visible in FIG. 6b) in the same way. For this purpose, the rectangle formed in plan by the top plate 208 and the frame 209 is smaller towards at least the upper and lower sides in FIG. 6a than the rectangular plan of the base plate 207. The electrode strips 213 (of the cathode 204) and 214 which are guided out form corresponding terminal pieces on the shoulders produced.

The cuboidal interior 211 of the discharge vessel 202 is completely coated with a mixture of fluorescent materials which is not represented in the figures and which converts the VUV radiation generated in the discharge into visible white light. This is a three-band fluorescent material having the blue component BAM ($BaMgAl_{10}O_{17}:Eu^{2+}$), the green component LAP ($LaPO_4$: [$Tb^{3+}$, $Co^{3+}$]) and the red component YOB ([Y, Gd]$BO_3:Eu^{3+}$). As already mentioned, reference is made in relation to the fluorescent materials to the application entitled "Signallampe und Leuchtstoffe dazu" [Signal lamp and fluorescent materials therefor].

By means of plug-in connectors and connecting lines (not represented), the described terminal pieces 213 and 214 of the electrode strips on the shoulder of the base plate 207 are respectively interconnected and connected jointly to the poles of a unipolar pulsed voltage source.

An embodiment of the flat radiator lamp according to FIGS. 6a and 6b for backlighting a 15 inch monitor could, for example, comprise 14 double anode strips and 15 cathodes with a single anode strip at the outermost edge in each case. Each cathode strip 203 and 204 could in this case respectively have 32 projections 220 towards each longitudinal side. Such a flat radiator lamp would have dimensions of approximately 315 mm×239×10 mm in conjunction with a wall thickness of the base plate 207 and of the top plate 8 of in each case 2.5 mm. The frame 209 could comprise a glass tube approximately 5 mm in diameter, with the result that 48 precision glass balls with a diameter of 5 mm would be suitable as spacers 48 (discussed in further detail below).

Figure 7A:
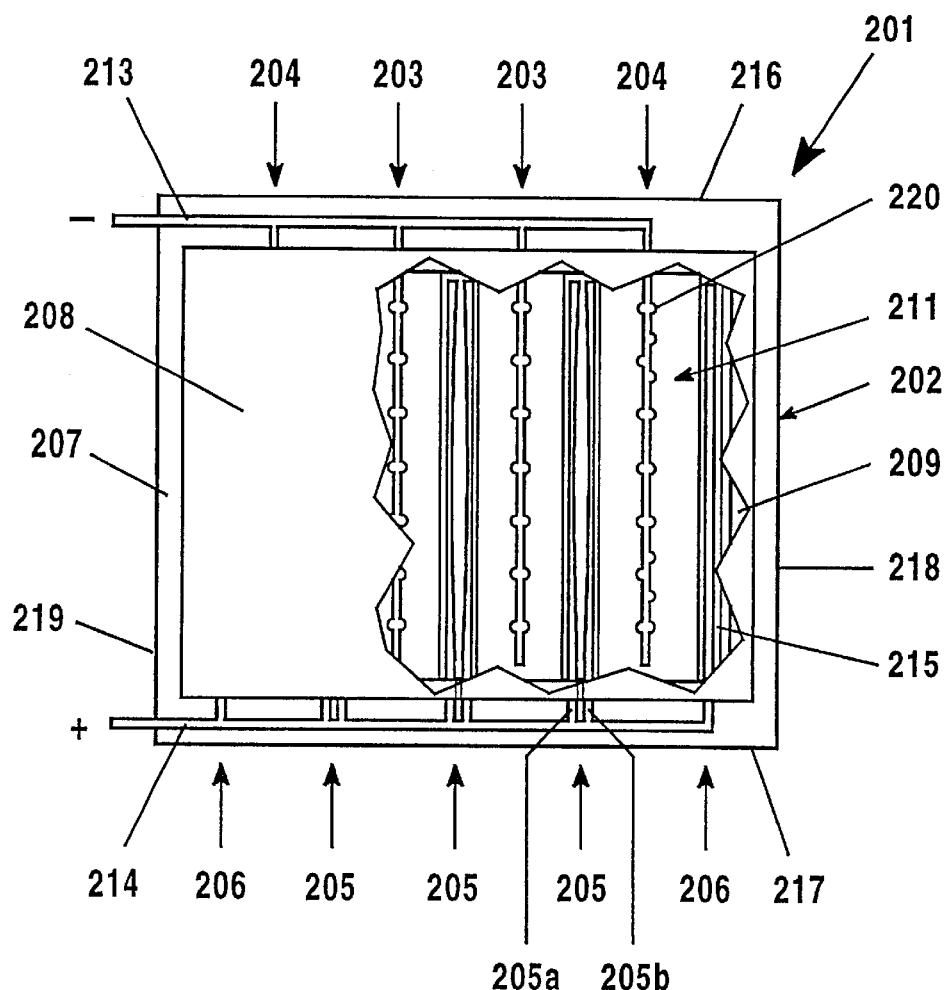
FIGS. 7a and 7b show a top view corresponding to FIG. 6a of an exemplary embodiment which is modified slightly with respect thereto and has an external bus structure and a side view corresponding to FIG. 6b.
Figure 7B:
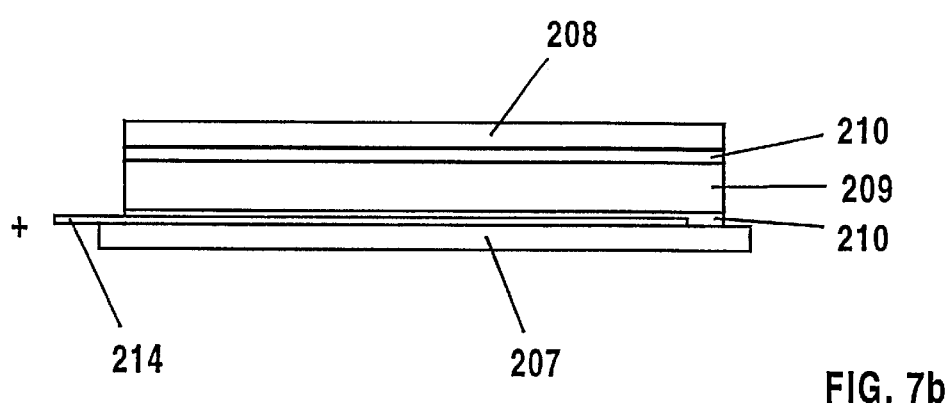

FIGS. 7a and 7b correspond largely to FIGS. 6a and 6b. The differences between the flat radiator lamp 201 represented here and that, 201', previously described, are as follows: the already described outer terminal pieces 213 and 214 denoted by the same reference numerals are combined here to form an outer bus-like supply lead and continued. The result is a common cathode terminal 213 in the top left-hand corner of FIG. 7a which projects beyond the edge of the base plate 207, and a corresponding common anode terminal 214 in the lower left-hand corner. This outer supply lead bus 214 of the anodes is also to be seen in the side view of FIG. 7b. Otherwise, the structure corresponds to that previously described, and is correspondingly denoted by reference numerals.

Figure 8:
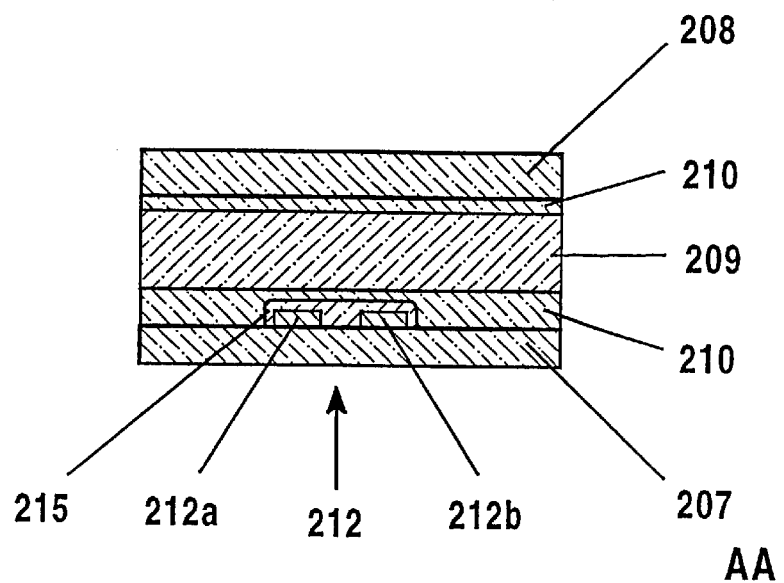
FIG. 8 shows a cross-sectional view for illustrating a feedthrough of a double anode in the two preceding exemplary embodiments.

FIG. 8 shows a detail view and cross-sectional view relating to the structure represented in FIGS. 6a, 6b, 7a and 7b (leaving aside the supply lead buses) This is a detail of the cross-sectional view indicated in FIG. 6a by the line A—A. This detail comprises two anode strips, specifically in the region of their feedthrough 212a and 212b through the boundary of the discharge vessel. It is to be seen that, by contrast with conventional feedthroughs and precisely in the same way as along the remaining length of the anode strips, the two anode feedthroughs 212a and 212b are applied directly to the base plate 207, and in this region are still completely covered by the glass layer 215 forming the dielectric of the dielectrically impeded discharge.

Each anode strip has an essentially rectangular cross-section and is enclosed therewith—including the glass layer 215 in the case shown here—completely by the glass solder layer 210, which connects the glass frame 209 to the base plate 207 and ensures a gas-tight enclosure. An equivalent glass solder layer 210 is also situated between the glass frame 209 and the cover plate 208. If the glass layer 215 were to be already omitted in this region, the lower glass solder layer 210 would have to be scarcely thicker than the upper one.

The double anode feedthroughs 212a and 212b represented here represent the other anode feedthroughs by way of example. The same conditions obtain in principle in the case of the feedthroughs of the cathodes 203 and 204 to the other side; the cathodes 203 and 204 occur only individually, and the glass layer 215 is missing.

Figure 9A:
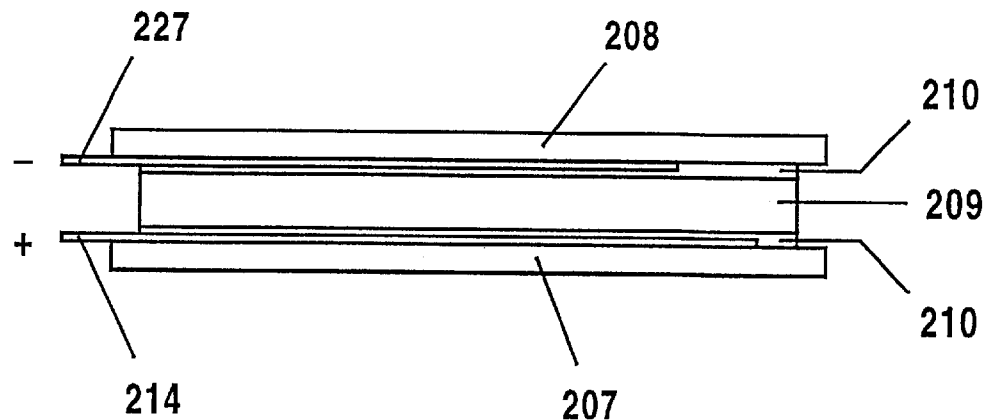
FIGS. 9a and 9b show a flat radiator lamp according to the invention, having electrodes on a base plate and on a top plate, specifically in a side view similar to FIGS. 6b and 7b, and in a cross-section, enlarged with respect thereto, through a detail of the lamp similar to FIG. 8.
Figure 9B:
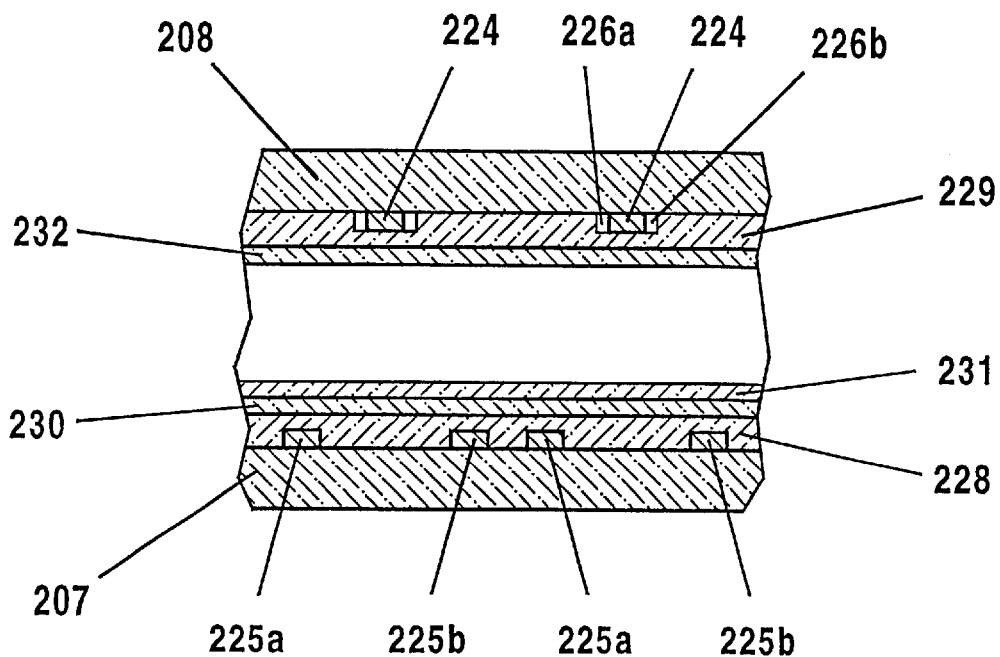

FIGS. 9a and 9b show diagrammatically in turn a further variation of the flat radiator lamps represented in FIGS. 6a, 6b, 7a and 7b and also 8. FIG. 9a corresponds in this case to the side views in FIGS. 6b and 7b, and FIG. 9b shows a cross-sectional view and detail view corresponding to FIG. 8.

An important difference from the lamps previously represented consists in that the cathodes 224 are applied to the inner wall of the top plate 208 in the case of the variants of FIGS. 9a and 9b. An alternating sequence of anode pairs 225a, 225b and cathodes 224 exists nevertheless, specifically in the configuration whereby an imaginary connection of a cathode 224 to the respectively nearest neighbour anodes 225a and 225b (from different pairs) produces the shape of an inverted and symmetrical V. In this case, the spacings between the cathodes 224 are approximately 22 mm wide here, and the spacings between the individual anodes 225a, 225b of an anode pair are approximately 4 mm, while those between neighbouring anodes of different anode pairs are approximately 18 mm.

Furthermore, FIG. 9b indicates the already described nose-like projections 226a and 226b on the cathodes 224. These projections are at a spacing of approximately 10 mm from one another in the strip direction.

The structure represented in FIG. 9b serves, again, by way of example for the entire width of the flat radiator lamp. This arrangement produces discharge structures between the base plate 207 and top plate 208 with a larger striking distance than the spacing between the base plate and top plate. It has emerged that it is possible using this arrangement to achieve higher UV yields than with an arrangement of all electrodes and only one plate. This is probably to be ascribed to a reduction in wall and electrode losses.

FIG. 9a further shows that both the cathodes 224 and the anodes 225a, 225b are in each case connected to outer bus-like supply leads 227 and 214, respectively, whose connecting point in FIG. 9a projects on the left-hand side beyond the top plate 208 or the base plate 207.

A further special feature of this exemplary embodiment is that both the cathodes 224 and the anodes 225a, 225b are completely covered by a dielectric glass layer 229 or 228 respectively, which otherwise covers the entire respective inner wall of the top plate 208 or base plate 207. The electrodes are thus embedded, as it were, in the glass walls of the lamp.

Furthermore, a light-reflecting layer 230 made from $Al_2O_3$ is applied to the dielectric glass layer 228 of the base plate 207. Exactly as on the dielectric glass layer 229 on the top plate 208, a layer of fluorescent material 231 or 232 made from a BAM-LAP-YOB-mixture is situated on said light-reflecting layer.

Figure 10:
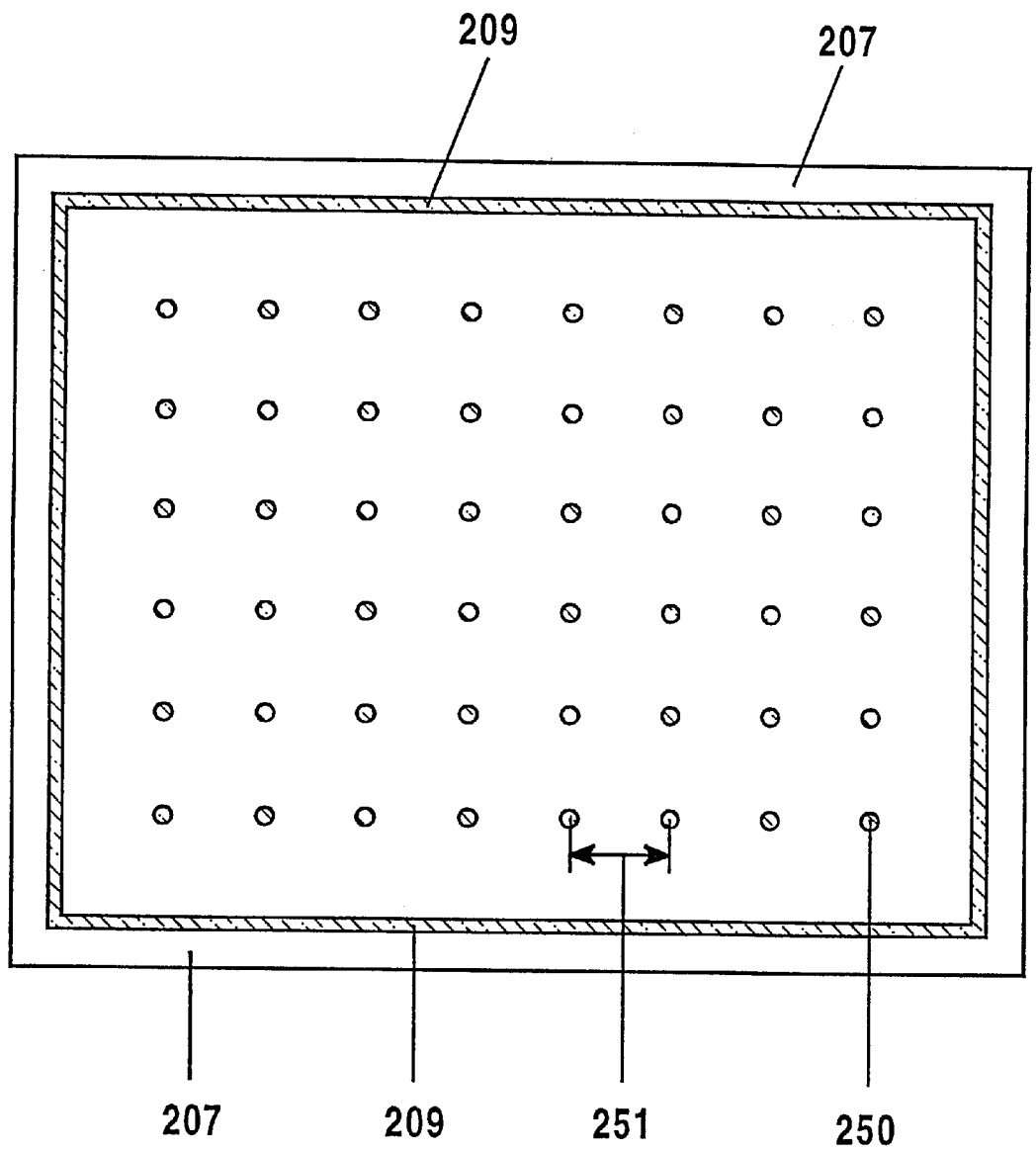
FIG. 10 shows a cross-sectional view, seen from the light exit side, of a flat radiator lamp according to the invention, for the purpose of illustrating the arrangement of spacers.

FIG. 10 shows a further feature of the flat radiator lamps, which, for the sake of clarity, is not shown in FIGS. 6a–9b. Spacers 250 are represented in a square grid arrangement in a top view, cut through the plane of the glass frame 209, of the base plate 207. Further details of the lamp, in particular the electrode structures, have been omitted for the sake of clarity.

The square grid of the spacers has a nearest neighbour spacing 251 of 34 mm. As already set forth, these are 48 precision glass balls with a diameter of 5 mm in each case, which are firmly connected by glass solder and heat treatment to the base plate 207 and the top plate 208. Each glass ball is coated with the already described reflecting layer 230 and a layer of fluorescent material 231, in order to minimize losses. The square grid represented here with a nearest neighbour spacing of 34 mm offers a good compromise between good mechanical strength of the flat radiator lamps overall and not excessively high losses in the generation of light. In the case of the arrangement of the spacers 250, it is to be borne in mind, furthermore, that they are arranged so that the discharge structures are disturbed as little as possible. One possibility is, for example, for the spacers to be seated in the middle between the respective electrode strips.

Figure 11:
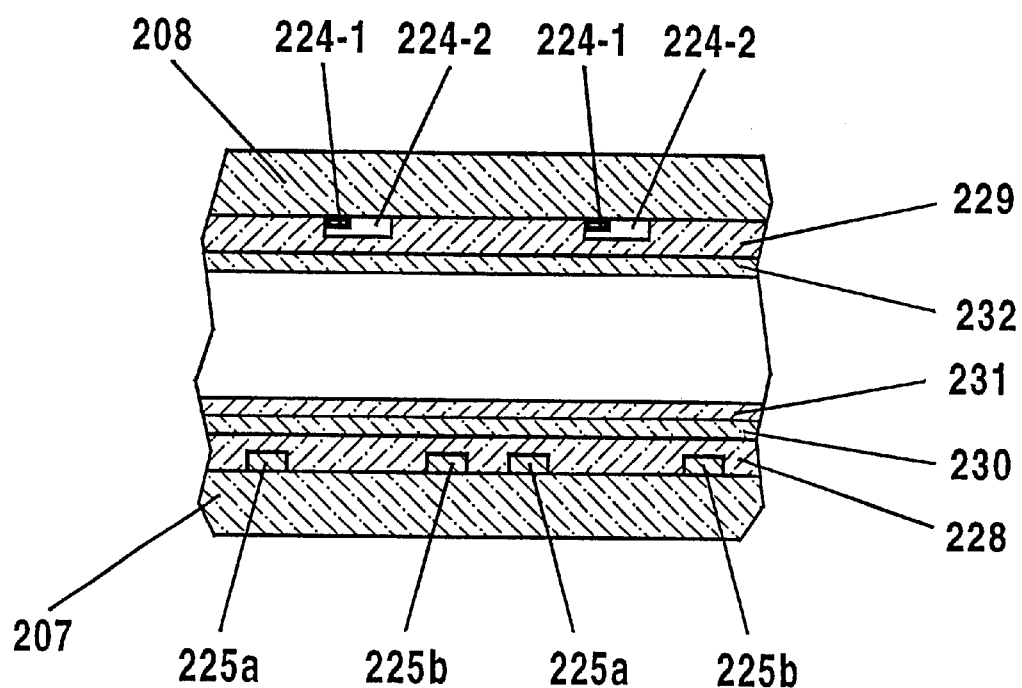
FIG. 11 shows a view of a detail and cross-section through a flat radiator according to the invention, for the purpose of illustrating a two-part cathode.

FIG. 11 refers to FIG. 9b, and exhibits a variation in the structure of the cathodes 224 by comparison with the structure represented there. For the sake of clarity, no projections (denoted in FIG. 9b by 226a and 226b) are represented. Nevertheless, they are possible and sensible with this exemplary embodiment.

The essential change in the cathode structure consists in its bipartite nature. Specifically, each cathode 224 comprises a first part 224-1, which is connected to the electric supply, and a second part 224-2. The first part 224-1 is illustrated in FIG. 11 in the upper left-hand corner of the second part 224-2, and consists of silver. The second part 224-2, which is very much larger in cross-sectional area, consists, by contrast, of ITO (indium tin oxide), a conductive, but transparent material.

This split produces a minimum shading by the nontransparent first part 224-1 in conjunction with a relatively large effective cathode width of the second part 224-2. This greater cathode width is of assistance in avoiding disadvantageous space charge effects upstream of the cathodes 224. On the other hand, the disadvantage of the structure in FIG. 9b is eliminated by the fact that the arrangement of electrodes on or under the transparent top plate 8 produces shading of the light radiation. This relates above all to the case in which the frequently somewhat wider cathodes are intended to be situated on the transparent side of the discharge vessel. In FIG. 9b, in turn, the doubled anodes 225a and 225b would have led to even greater shading. Of course it is also possible to construct a double anode in each case in two parts in the above described fashion.

Figure 12:
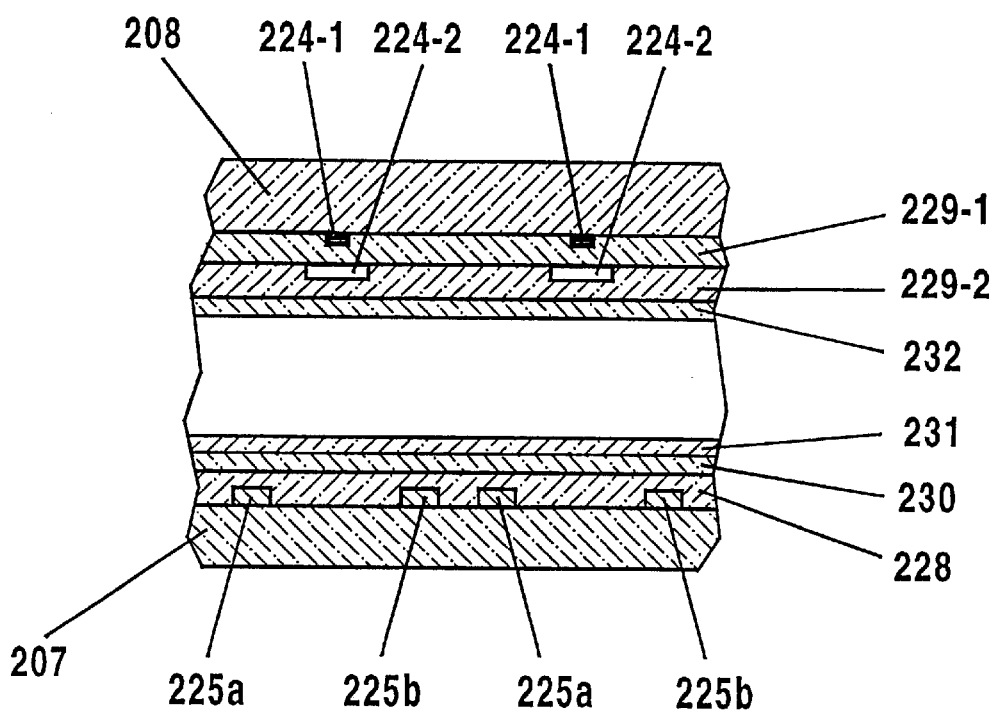
FIG. 12 shows a cross-sectional view corresponding to FIG. 11 relating to a further possibility for a two-part cathode.

In order to show that direct physical contact between the two parts 224-1 and 224-2 of the cathodes is not mandatory for an electric connection, FIG. 12 shows an example in which the two cathode parts are separated. This is performed by initially depositing the first part 224-1 on the top plate 208, and then covering it by a first part 229-1 of the dielectric layer 229, whereupon the second part 224-2 of the cathode is deposited. The second part 229-2 of the dielectric layer 229 follows. The capacitive coupling between the two parts 224-1 and 224-2 of the cathodes ensures an adequate electric connection between the two cathode parts in conjunction with the high operating frequency of the pulsed voltage source to be employed here.

So that the relatively large effective cathode width of the second part 224-2 can also become effectively active for the discharge, the second cathode part 224-2 is arranged here on the discharge side of the first cathode part 224-1. Thus, from the perspective of a discharge the sequence is: discharge-layer of fluorescent material 232- second dielectric layer 229-2—second cathode part 224-2—first dielectric layer 229-1—first cathode part 224-1—top plate 208. In the projection onto the base plate 208, the narrower first cathode part 224-1 is preferably located in this case in the middle of the second cathode part 224-2.

Figure 13:
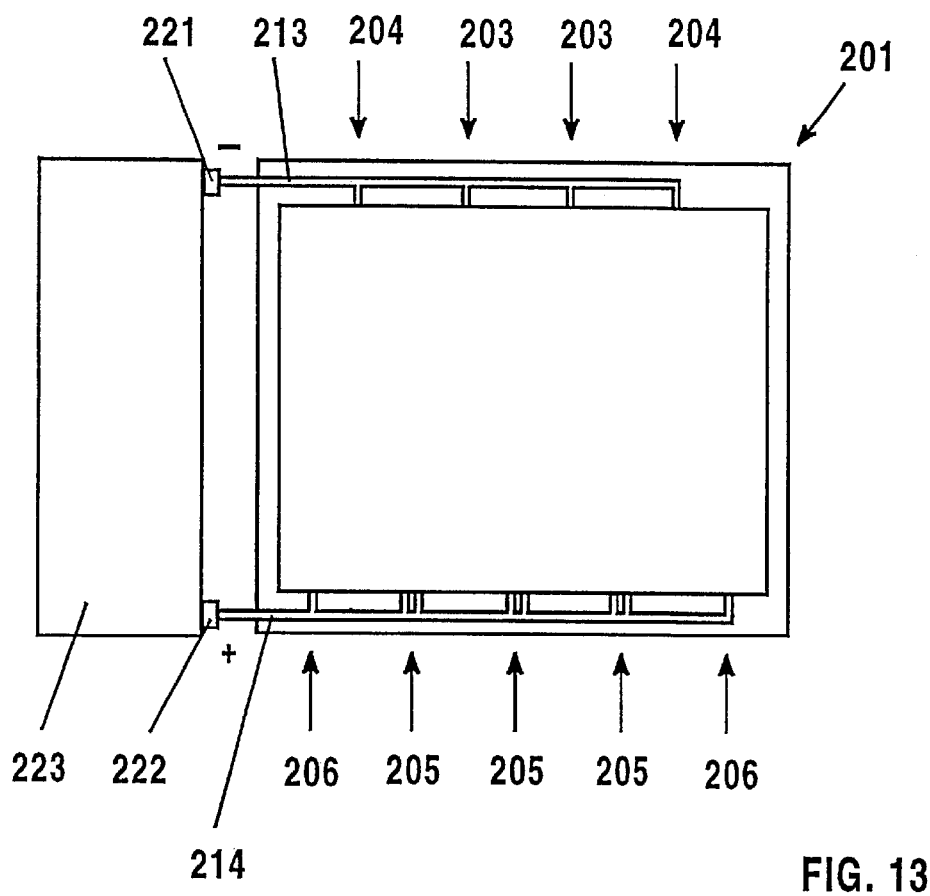
FIG. 13 shows a top view of a lighting system according to the invention and having a pulsed power source.

FIG. 13 shows as an example the structure of FIG. 7a connected to a pulsed voltage source 223. The already described supply lead buses 213 and 214 of the cathodes 203 and 204 and of the anodes 205 and 206 are respectively connected to a corresponding pole 221 or 222. The pulsed voltage source 223, of which the inner structure is not represented in more detail, supplies unipolar voltage pulses of specific duration with pauses, again of specific duration, therebetween. Reference is made to German patent application 195 48 003.1. This special form of the electrical supply generates a multiplicity of individual delta-shaped discharge structures (not represented in the figures) between the extensions 220 of the cathodes 203 and 204 and the corresponding nearest neighbour anode 205 or 206. The lamp according to the invention is supplemented by this pulsed voltage source 223 to form a lighting system.

Figure 14:
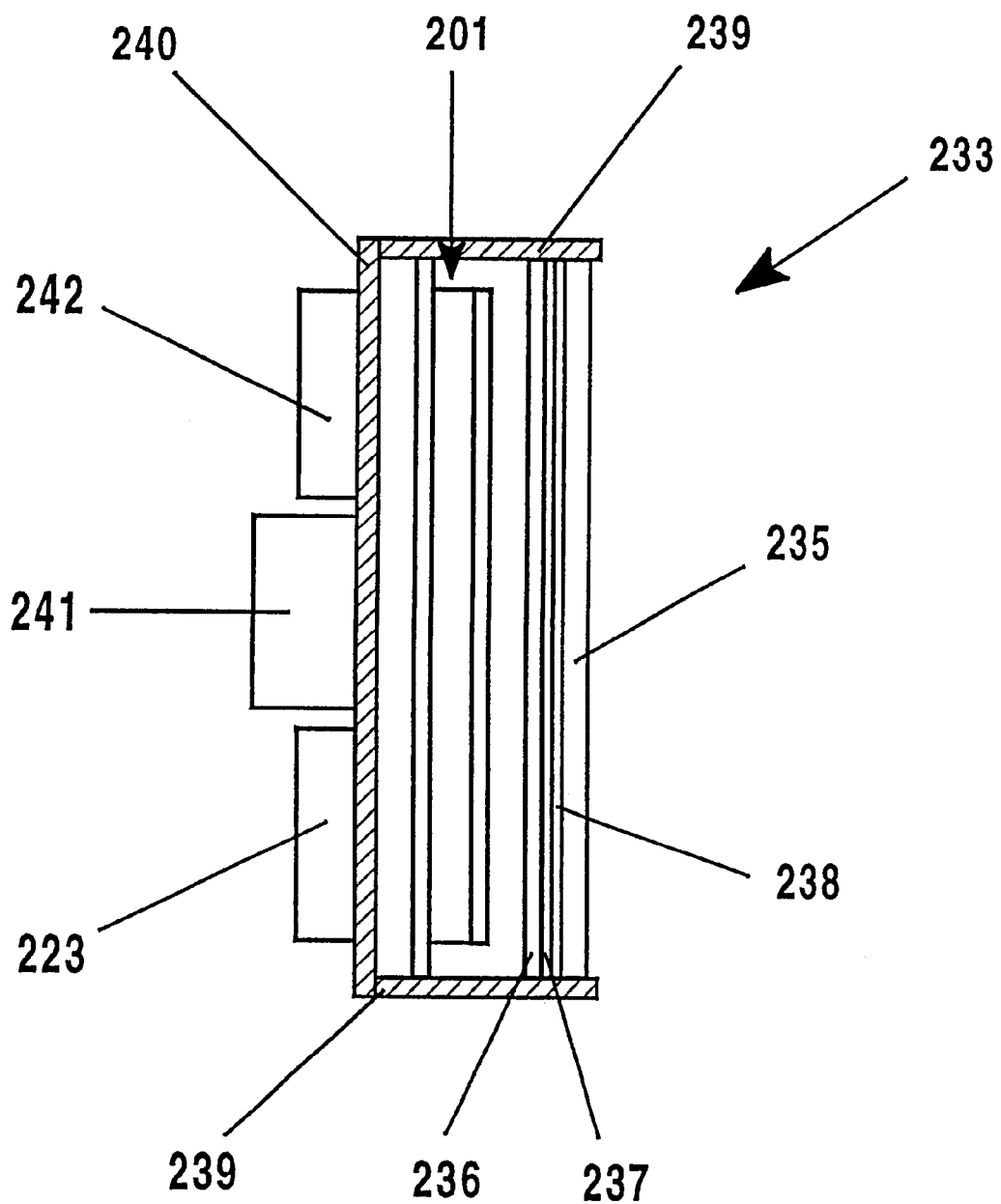
FIG. 14 shows a sectional view through a flat screen system according to the invention.

FIG. 14 shows a further exemplary embodiment, in which the same lamp 201 with the pulsed voltage source 223 serves as a background lighting system for a flat screen 235 using liquid crystal technology. Located between the flat screen 235 and the lamp 201 on the lamp side there is a diffuser plate 236 which serves to cover punctiform irregularities in the generation of light in the lamp 201, in particular because of the spacers already described. Two crossed light amplifying films 237 and 238 (so-called "brightness enhancement films" from the 3M company) are located on the side of the diffuser plate 236 averted from the lamp. These crossed light amplifying films 237 and 238 respectively have the prismatically structured surface on the side averted from the lamp (the longitudinal edge of the prisms being crossed in the plane of the film), as a result of which the light amplifying films—237 and 238 restrict, in one dimension in each case, the relatively large solid angle range of the emission of light from the lamp 201, which solid angle range is additionally enlarged by the diffuser plate.

This total structure is held in a frame 239 of a housing. A housing rear wall 240 further supports a cooling device 241 and an electronic drive system 242 for the flat screen 235. In a particular embodiment the cooling device 241 is designed as a thin plate which has good thermal contact with the back side of the lamp and has cooling ribs on the other side, or has good thermal contact with the ribs of the cooling body. In order to ensure a particularly good heat dissipation which is required for high-power systems, the cooling device designed as a thin plate can also form the immediate back wall of the flat screen system. Details of the electronic drive system 242 and the flat screen 235 follow from, for example, EP 0 604 453.

The flat screen system shown in FIG. 14 is the preferred application of the invention. Here, it is possible to realize very bright and uniform background lighting by means of a particularly flat lamp. The mercury-free and thus environmentally compatible filling systems with an inert gas, preferably xenon, and possibly one or more buffer gases, for example argon or neon, at a pressure from approximately 10 kPa to approximately 100 kPa permits immediate starting without a run up response. This is very advantageous in the case of work breaks, for example, because the screen can be switched off to save energy, without its performance thereby being impaired after it is switched on again. There is also no need for external reflectors or light-guiding devices in favour of minimizing the size of the overall screen system and of rendering the design less expensive and simpler. A substantial advantage of the flat screen system in accordance with the invention is—with regard to the lamp—the considerably higher service life by contrast with the porior art. Values of far more than 20,000, hours of operation can readily be achieved, which corresponds to more than the doubling of the conventional values.

What is claimed is:

1. Gas discharge lamp having a discharge vessel (5, 202) which is at least partially transparent and filled with a gas filling, a number of essentially strip-shaped anodes (A, 7, 103, 104, 108, 109, 110, 205, 206, 225) and cathodes (K, 6, 103, 104, 111, 203, 204, 224) which extend on walls of the discharge vessel and essentially parallel to one another, and a dielectric layer (10, 215, 228, 229) between at least the anodes and the gas filling for a dielectrically impeded discharge in the discharge vessel between neighbouring anodes and cathodes, characterized in that at least one anode pair (A, A', 7ab, 103ab, 104ab, 108ab, 205, 225ab) is arranged between two cathodes (K, 6, 103, 104, 111, 203, 204, 224) respectively adjacent to one anode of the pair.

2. Lamp according to claim 1 as flat radiator.

3. Lamp according to claim 1, in which the discharge vessel (5, 202) consists of electrically non-conductive material.

4. Lamp according to claim 1, in which the spacing between the anodes of the pair (A, A', 7a, 7b, 103ab, 104ab, 108ab, 205, 225ab) is smaller than the spacing between a respective anode of the pair and the cathode (K, 6, 103, 104, 111, 203, 204, 224) adjacent to it.

5. Lamp according to claim 1, in which the spacing of the anodes of the pair (A, A', 7a, 7b, 103ab, 104ab, 108ab, 205, 225ab) from one another is between 20% and 100% of the striking distance of the discharge.

6. Lamp according to claim 1, in which at least the anodes (A, 7, 103, 104, 108, 109, 110, 205, 206, 225) or the cathodes (K, 6, 103, 104, 111, 203, 204, 224) are applied to an inner wall of the discharge vessel (5, 202) and are guided in an extension of the strip shape directly through a boundary (209) of the discharge vessel which delimits the gas filling.

7. Lamp according to claim 6, in which the discharge vessel (5, 202) has at least one plate (8, 207) which goes beyond the boundary (209) of the discharge vessel, and the anodes (A, 7, 103, 104, 108, 109, 110, 205, 206, 225) or cathodes (K, 6, 103, 104, 111, 203, 204, 224) are applied to the plate in such a way that they are guided through the discharge vessel onto the plate at the boundary.

8. Lamp according to claim 6, in which the strip shape of the anodes (A, 7, 103, 104, 108, 109, 110, 205, 206, 225) or cathodes (K, 6, 103, 104, 111, 203, 204, 224) has an essentially rectangular cross-section with a thickness in the range of 3–50 μm, and with a width of 0.3–1.5 mm.

9. Lamp according to claim 6, in which both the anodes (A, 7, 103, 104, 108, 109, 110, 205, 206, 225) and the cathodes (K, 6, 103, 104, 111, 203, 204, 224) are applied to the inner wall and are guided in an extension of their strip shape directly through the boundary (209) of the discharge vessel (5, 202).

10. Lamp according to claim 9, in which the anodes (103, 104, 108, 109, 110, 205, 206) and the cathodes (103, 104, 111, 203, 204) are combined at least outside the discharge vessel (5,202) to form in each case a common supply lead bus (105, 106, 213, 214, 227).

11. Lamp according to claim 1, in which the anode pairs (7ab, 103ab, 104ab, 108ab, 205, 225ab) are combined at least outside the discharge vessel (5, 202) to form a common terminal (7c, 105, 106, 114, 115, 214).

12. Lamp according to claim 1, in which the strip-shaped anodes (205) are widened in an edge region of the discharge vessel (5, 202) by comparison with a middle region of the discharge vessel or are widened in the surroundings on a non-homogeneity of the discharge vessel.

13. Lamp according to claim 12, in which the widening of the anodes (205) is constructed asymmetrically, with respect to the respective other anode (205) of the pair.

14. Lamp according to claim 1, in which the anodes (225) and the cathodes (224) are respectively arranged on opposing inner walls of the discharge vessel in such as way that, viewed in strip direction, imaginary connecting lines between a cathode and two nearest neighbouring anodes form an essentially symmetrical V.

15. Lamp according to claim 1, in which the cathodes (111, 203, 204, 224) have along their longitudinal strip sides projections (113, 220, 226) for spatially fixing an individual discharge structure.

16. Lamp according to claim 15, in which for the purpose of achieving a homogeneous luminous density of the lamp, the projections (220) are situated more densely in an edge region of the discharge vessel (202) than in a middle region of the discharge vessel or are situated more densely in the surroundings of a non-homogeneity of the discharge vessel.

17. Lamp according to claim 1, in which the discharge vessel (202) is of plate-like design and has a base plate (207) and a top plate (208) which are arranged essentially parallel to one another at a relatively small spacing by comparison with their length or width, spacers (250) arranged between the base and top plates.

18. Lamp according to claim 17, in which the spacers (250) are arranged at a nearest neighbour spacing (251) from one another whose product with the thickness of the strip-shaped anodes (205, 206, 225) or cathodes (203, 204, 224) is in the range from $5 \times 10^{-8}$ m$^2$ to $6.8 \times 10^7$ m$^2$.

19. Lamp according to claim 17, in which the spacers (250) are arranged at a nearest neighbour spacing (251) from one another whose ratio to the smaller thickness of the base plate (207) and of the top plate (208) is in the range from 8 to 20.

20. Lamp according to claim 1, in which the cathodes (224-1 224-2) are mounted on or in an inner wall of a transparent light-emitting side (208) of the lamp, and these cathodes in each case have a first part (224-1) which is a good electric conductor, and a second part (224-2) of lesser conductivity and greater width than the first part, the second part being essentially transparent in the light-emitting direction (208) and being connected to the first part in a fashion which is electrically conducting with respect to the operating frequency of the lamp.

21. Lamp according to claim 20, in which the cathodes (224-1, 224-2) have an essentially rectangular cross-section on or in the inner wall of the transparent light-emitting side (208), and the first part (224-1) is contained in the essentially rectangular cross-sectional shape of the second part (224-2).

22. Method for producing a lamp according to claim 6, in which at least the anodes or the cathodes (203–206) guided through the boundary (209) of the discharge vessel (202) are applied, including the feedthrough section (212), using screen printing.

23. Lighting system having a lamp according to claim 1 and an electrically pulsed voltage source (223) which is designed for the purpose of supplying the lamp with voltage pulses separated from one another by interpulse pauses, the result being a continuous lighting operation of the lamp stretching over the separate voltages pulses.

24. Flat screen system having a flat screen (235) for displaying information, and a lamp according to claim 1 which is arranged essentially parallel to the flat screen in order to backlight the latter.

25. Flat screen system according to claim 24 having a lighting system and an electrically pulsed voltage source (223) which is designed for the purpose of supplying the lamp with voltage pulses separated from one another by interpulse pauses, the result being a continuous lighting operation of the lamp stretching over the separate voltage pulses.

26. Flat screen system according to claim 24, in which at least one light amplifying film (237, 238) is arranged between the flat screen (235) and the lamp.

\* \* \* \* \*